(12) United States Patent
Smith et al.

(10) Patent No.: US 10,935,733 B2
(45) Date of Patent: Mar. 2, 2021

(54) RETENTION APPARATUS AND METHOD FOR TERMINATING A JACKETED CABLE

(71) Applicants: Paul Wesley Smith, Santa Barbara, CA (US); Ryan John Schmidt, Santa Barbara, CA (US)

(72) Inventors: Paul Wesley Smith, Santa Barbara, CA (US); Ryan John Schmidt, Santa Barbara, CA (US)

(73) Assignee: Intri-Plex Technologies Inc., Goleta, CA (US)

( * ) Notice: Subject to any disclaimer, the term of this patent is extended or adjusted under 35 U.S.C. 154(b) by 0 days.

(21) Appl. No.: 16/261,889

(22) Filed: Jan. 30, 2019

(65) Prior Publication Data

US 2020/0241217 A1 Jul. 30, 2020

(51) Int. Cl.
*G02B 6/38* (2006.01)
*G02B 6/36* (2006.01)
*G02B 6/44* (2006.01)

(52) U.S. Cl.
CPC .......... *G02B 6/3887* (2013.01); *G02B 6/4432* (2013.01)

(58) Field of Classification Search
CPC .................. G02B 6/3887; G02B 6/4432
USPC .............. 385/62, 65, 66, 83, 84, 87
See application file for complete search history.

(56) References Cited

U.S. PATENT DOCUMENTS

| 7,431,515 | B1 | 10/2008 | Penumatcha et al. |
| 9,016,953 | B2* | 4/2015 | Ott ........................ G02B 6/2551 |
| | | | 385/60 |
| 9,395,500 | B2 | 7/2016 | Zimmel |
| 2003/0128938 | A1 | 7/2003 | Caveney |
| 2005/0226589 | A1 | 10/2005 | Hafner et al. |
| 2015/0198773 | A1* | 7/2015 | Nakama ............... G02B 6/3885 |
| | | | 385/79 |
| 2016/0209599 | A1* | 7/2016 | Van Baelen ......... G02B 6/3871 |
| 2018/0100972 | A1 | 4/2018 | Zimmel et al. |

FOREIGN PATENT DOCUMENTS

GB 2031605 B 3/1983

* cited by examiner

*Primary Examiner* — Kaveh C Kianni
*Assistant Examiner* — Hung Q Lam
(74) *Attorney, Agent, or Firm* — Barcelo, Harrison & Walker, LLP; Joshua C. Harrison, Esq.

(57) ABSTRACT

An end connector for a jacketed cable includes a rear body having a cylindrical retention portion with an outer surface that includes a plurality of recessed annular grooves. The cylindrical crimp comprises a plurality of thicker annular regions adjacent to and separated by a plurality of thinner annular regions. Each thicker annular region of the cylindrical crimp is axially aligned with a corresponding recessed annular groove on the outer surface of the cylindrical retention portion of the rear body, and such alignment is maintained during crimping to trap strength members of the jacketed cable.

14 Claims, 6 Drawing Sheets

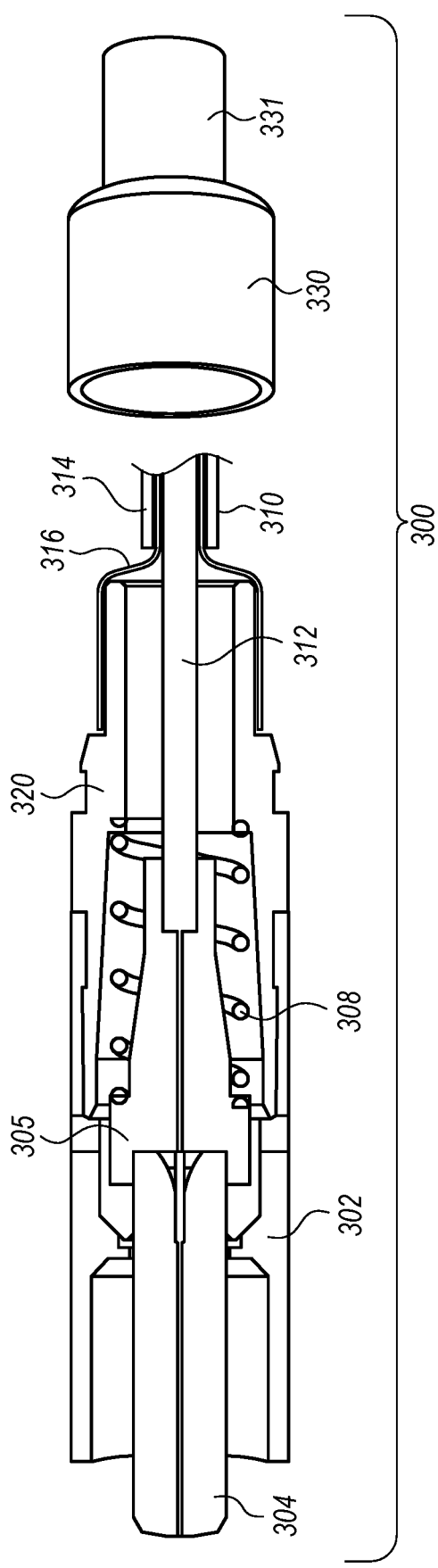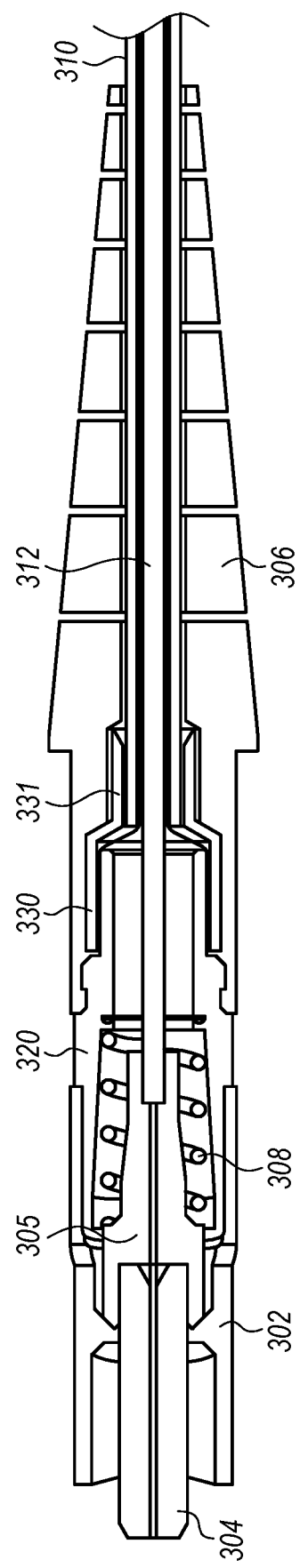
FIG. 3A (PRIOR ART)
FIG. 3B (PRIOR ART)

RETENTION APPARATUS AND METHOD FOR TERMINATING A JACKETED CABLE

BACKGROUND

Fiber-optic cables include a light-conducting inner core that typically includes a glass or plastic light-conducting fiber surrounded (in cross-section) by a cladding having a lower refractive index. The inner core is surrounded (in cross-section) by an outer tubular protective jacket that itself includes or surrounds strength members. The strength members may be a tubular weave of aramid yarn, and provide strain resistance and stress relief from external loads (e.g. axial loads) to reduce or prevent damage to the inner core. Certain coaxial cables having electrically conductive cores also include similar strength members to resist stress or strain.

Fiber-optic cables are typically terminated by being joined to an end connector, and must thereafter be retained by the end connector. End connectors typically include a ferrule for receiving the inner core of the fiber-optic cable, and a clamping or crimping structure for binding and retaining the strength members of the outer jacket. Adhesive or other structures may also be used to help bind or seal to the outer jacket. Many cables for carrying electrical signals are also terminated by being joined to an end connector.

The integrity of the light conduction to and through the end connector may be degraded or interrupted by separation or axial slippage between the clamping or crimping structure of the end connector and the strength members of the outer jacket of the fiber-optic cable. Likewise, separation may also degrade or interrupt electrical conduction at a connecting end of a cable for carrying electrical signals. Hence there is a need in the art for improved retention structures and methods to prevent separation or axial slippage between a fiber-optic (or other) cable, and mating components of its terminating end connector.

BRIEF DESCRIPTION OF THE DRAWINGS

FIG. 3A depicts a cross-sectional side view of a partially-assembled conventional fiber optic cable end connector.

FIG. 3B depicts the conventional fiber optic cable end connector of FIG. 3A, except fully assembled.

DESCRIPTION OF EXAMPLE EMBODIMENTS

Figure 1:
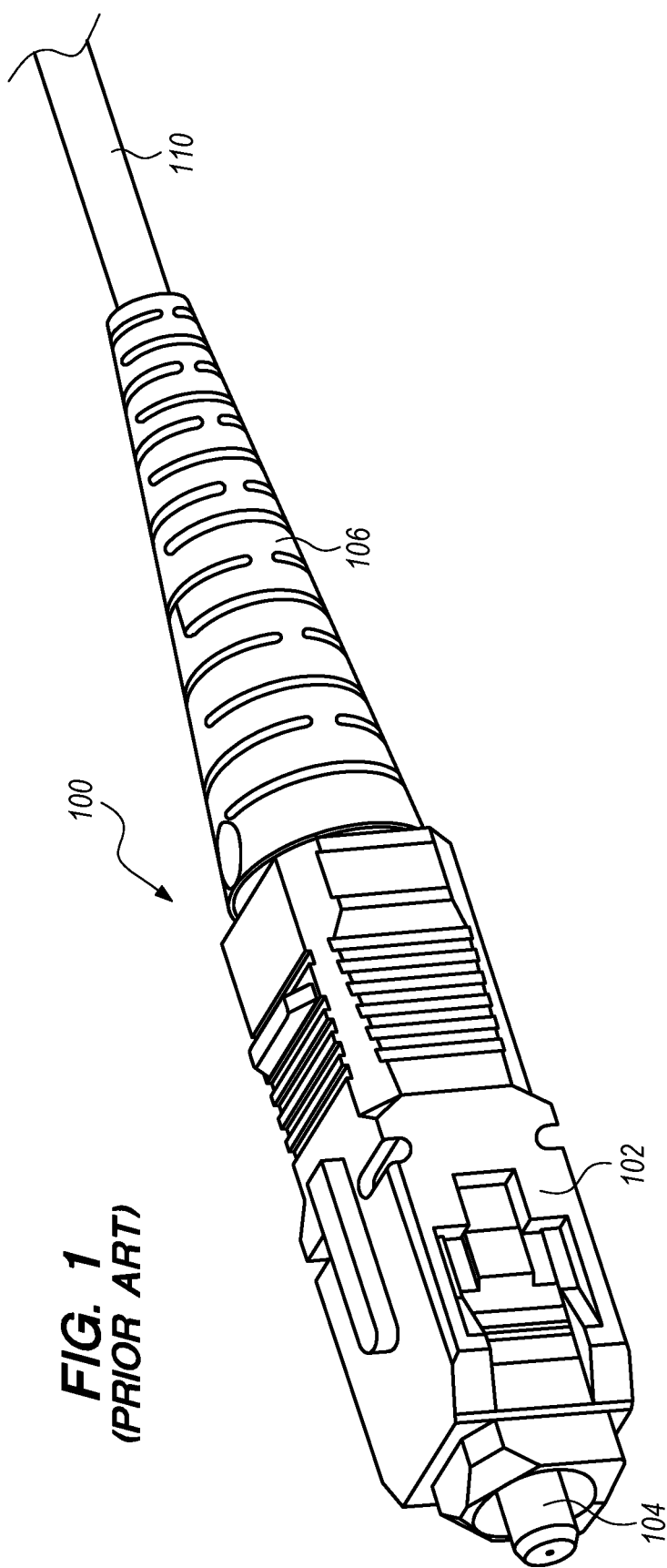
FIG. 1 depicts an assembled perspective view of a conventional fiber optic cable end connector.

FIG. 1 depicts an assembled perspective view of a conventional end connector 100 for a fiber optic cable 110. The end connector 100 includes an outer housing 102, an inner ferrule 104, and a bend limiting boot 106.

Figure 2:
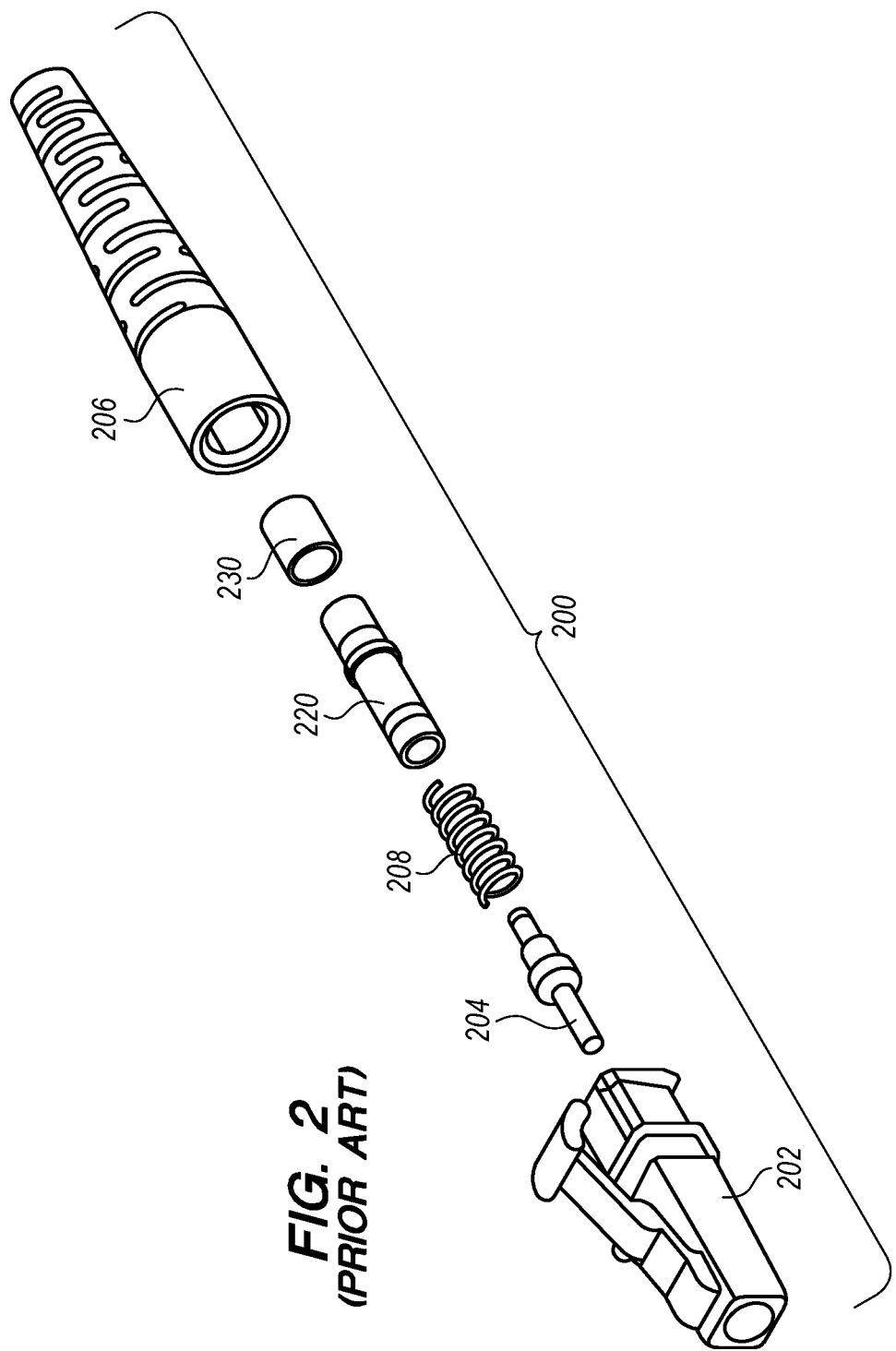
FIG. 2 depicts an exploded perspective view of another conventional fiber optic cable end connector.

FIG. 2 depicts an exploded perspective view of another conventional fiber optic cable end connector 200. The end connector 200 includes an outer housing 202 that may retain the end connector 200 in a receiving jack during use, and an inner ferrule 204 that receives and supports the light-conducting fiber of an inner core of the cable (not shown in FIG. 2) at its terminated end. The end connector 200 also includes a compression spring 208 that preloads the ferrule 204 against a mating surface of the receiving jack, for more reliable light coupling during use. The end connector 200 also includes a crimp 230 and a rear body 220 that is coupled to the outer housing 202. These components help to bind and retain the strength members of an outer protective jacket of the cable. For example a conventional crimping tool may be used to plastically deform the crimp 230 inward to clamp the outer protective jacket of the cable and thereby provide some strain relief from external loads that may be applied to the cable during use. The end connector 200 also includes a conventional bend-limiting boot 206.

FIG. 3A depicts a cross-sectional side view of a partially-assembled conventional fiber optic cable end connector 300. FIG. 3B depicts a cross-sectional side view of the conventional fiber optic cable end connector 300, fully-assembled. The end connector 300 includes an outer housing 302 that may retain the end connector 300 in a receiving jack during use, and a two-piece inner ferrule assembly 304, 305 that receives and supports the light-conducting fiber of a cladded inner core 312 of a cable 310 at its terminated end. The end connector 300 also includes a compression spring 308 that preloads the inner ferrule assembly 304, 305 against a mating surface of the receiving jack, for more reliable light coupling during use. The end connector 300 also includes a crimp 330, and a rear body 320 that is coupled to the outer housing 302. These components help to bind and retain strength members 316 of an outer protective jacket 314 of the cable 310, for example to provide strain relief from external loads that may be applied to the cable 310 during use. The crimp 330 is shown exploded away from the rest of the assembly in FIG. 3A, and in assembled position in FIG. 3B. The crimp 330 is of constant thickness, but has a region of reduced diameter 331. The larger diameter portion of the crimp 330 is crimped over a cylindrical portion of the rear body 320, to bind the strength members there between. The smaller diameter portion 331 of the crimp 330 may be crimped over the cable 310 to help retain the outer jacket 314. The end connector 300 also includes a bend-limiting boot 306.

Figure 4:
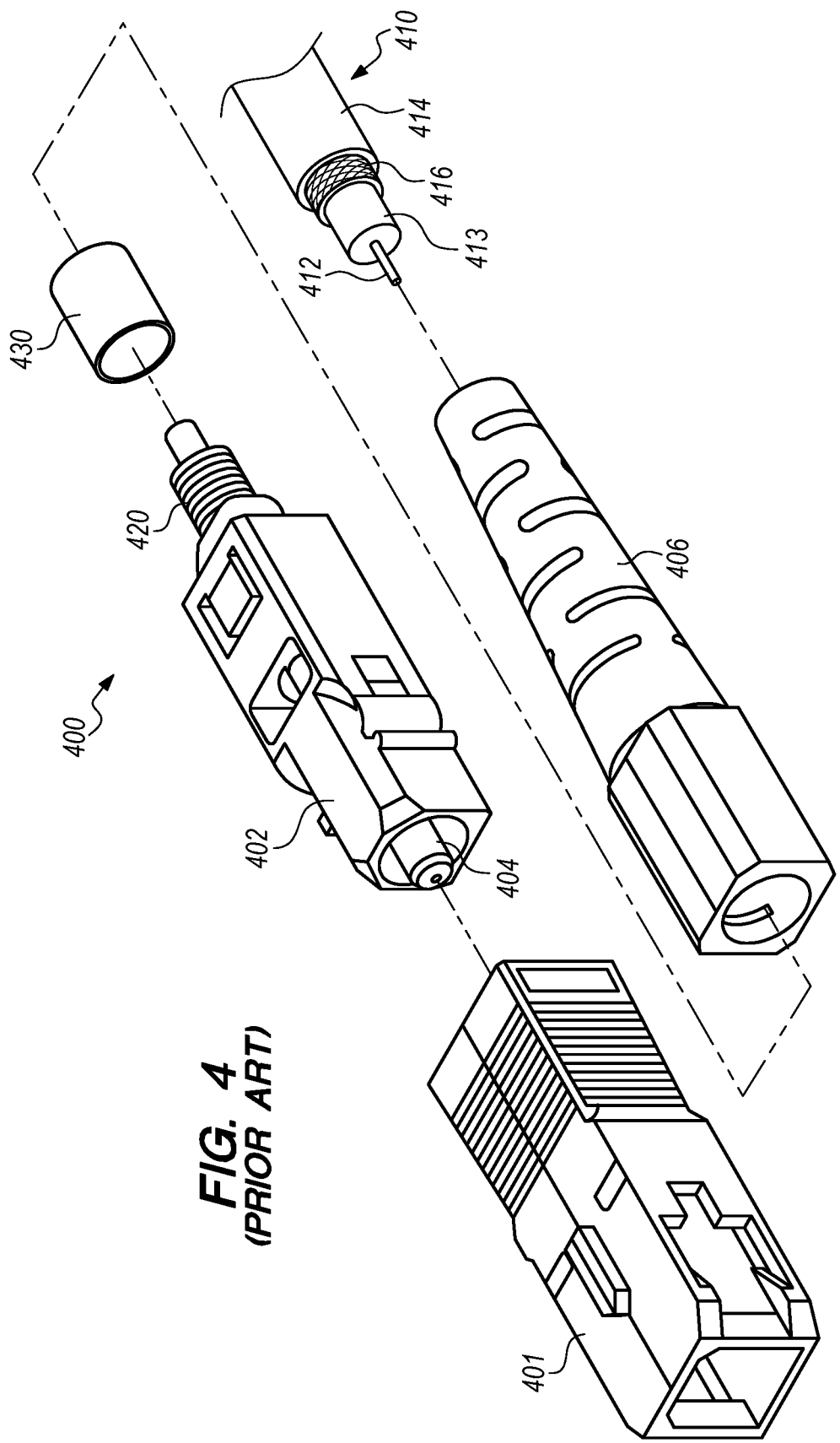
FIG. 4 depicts an exploded perspective view of another conventional fiber optic cable end connector.

FIG. 4 depicts an exploded perspective view of another conventional fiber optic cable end connector 400. The end connector 400 includes a two-piece housing 401, 402 that may retain the end connector 400 in a receiving jack during use. The end connector 400 includes an inner ferrule 404 that receives and supports an inner core 412, 413 of a fiber optic cable 410 at its terminated end. The inner core 412, 413 includes a light-conducting fiber 412 that is surrounded (in cross-section) by a thicker cladding 413 that has a lower refractive index. The end connector 400 also includes a cylindrical crimp 430, and a rear body 420 that is coupled to the outer housing piece 402. The crimp 430, and the rear body 420 help to bind and retain strength members 416 of an outer protective jacket 414 of the cable 410, for example to provide strain relief from external loads that may be applied to the cable 410 during use. The end connector 400 also includes a conventional bend-limiting boot 406.

Figure 5A:
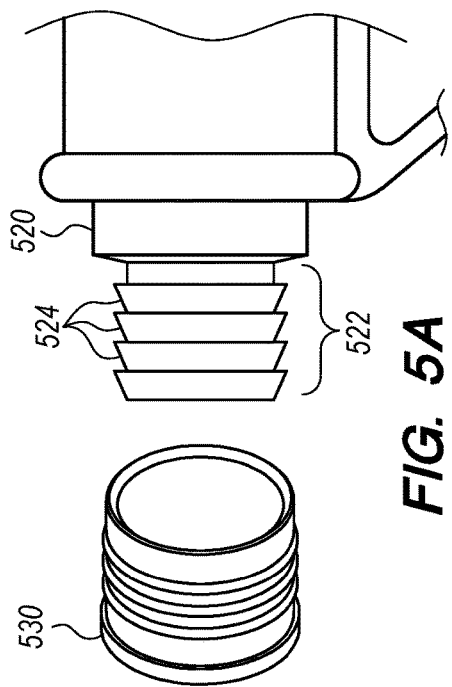
FIG. 5A depicts a rear body and crimp according to an embodiment of the present invention.
Figure 5B:
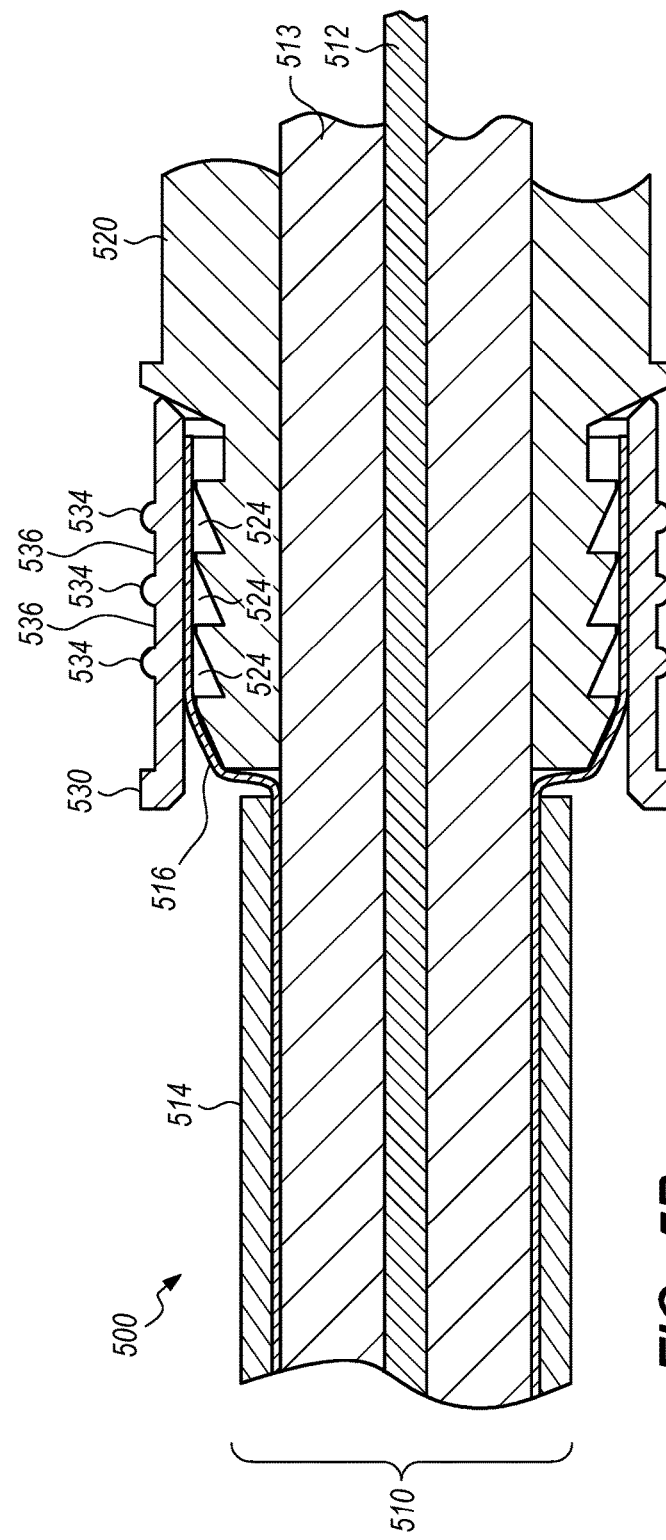
FIG. 5B depicts a cross-sectional side view of a cable end connector according to an embodiment of the present invention, which utilizes the rear body and crimp of FIG. 5A.

FIG. 5A depicts a rear body 520 and crimp 530 according to an embodiment of the present invention. FIG. 5B depicts a cross-sectional side view of a cable end connector 500 according to an embodiment of the present invention, which utilizes the rear body 520 and crimp 530. The crimp 530 may have the cross-section of a circular annulus, but does not necessarily have such a circular cross-section. Alternatively, the crimp 530 may have an annular cross section of other shapes (e.g. hexagonal, octagonal, etc.), and still be considered cylindrical herein. Hence, the word cylinder, as used herein, is not limited to right circular cylinders. The cable end connector 500 may terminate a cable 510 having an inner core 512, 513, and an outer jacket 514 that includes strength members 516 (e.g. aramid fibers). Optionally, the inner core 512, 513 includes a signal-conducting wire or fiber 512 that may be surrounded (in cross-section) by a cladding 513 that may be insulative or have a different refractive index. In some embodiments, the signal-conducting wire or fiber 512 may optionally be a conventional bundle of a plurality of optical fibers that together may carry a plurality of signals.

As shown in FIGS. 5A and 5B, the end connector 500 includes a rear body 520 that includes a cylindrical retention portion 522, an outer surface of the cylindrical retention portion 522 including a plurality of recessed annular grooves 524. The plurality of recessed annular grooves 524 may optionally be shaped to create a sawtooth profile in cross-section, as shown. FIG. 5B shows that the strength members 516 of the cable 510 may extend over and around the cylindrical retention portion 522. In certain embodiments, the cylindrical retention portion 522 may optionally include an extension of reduced diameter (not shown) that may protrude under the outer jacket 514 to help seal the rear body 520 with the cable 510. Alternatively or in addition, the end connector 500 may include a conventional bend-limiting boot that extends as an outermost component over the rear body 520 and an adjacent portion of the cable 510, to reduce relative angular deflection between them.

In the embodiment of FIGS. 5A and 5B, the end connector 500 includes a cylindrical crimp 530 that is positioned around the rear body 520. The cylindrical crimp allows the strength members 516 to extend between the cylindrical crimp 530 and the outer surface of the cylindrical retention portion 522 of the rear body 520. The crimp 530 is preferably fabricated from a malleable metal (e.g. aluminum, aluminum alloys, copper, copper alloys such as brass, steel, steel alloys, etc), so that a conventional crimping tool may be used to plastically deform the crimp 530 inward to trap the strength members 516 of the outer protective jacket 514, and thereby provide strain relief from external loads that may be applied to the cable 510 during use. Steel crimps would normally be thinner than brass or aluminum crimps, so that a standard crimping tool may be used effectively to plastically deform either in compression. In certain embodiments, the crimp 530 and/or the rear body 520 may be plated (e.g., with a nickel plating).

As shown in FIGS. 5A and 5B, the cylindrical crimp 530 includes a plurality of thicker annular regions 534 separated by respective ones of a plurality of thinner annular regions 536. In the embodiment of FIGS. 5A and 5B, each of the plurality of thicker annular regions 534 protrudes radially outwardly relative to an adjacent one of the plurality of thinner annular regions 536 of the cylindrical crimp 530. The thicker annular regions 534 preferably have a greater radial thickness than the thinner annular regions 536. For example, in certain embodiments a ratio of the greater radial thickness of the thicker annular regions 534, to the lesser radial thickness of the thinner annual regions 536, is preferably in the range 1.25 to 3.

During assembly, the thicker annular regions 534 of the cylindrical crimp 530 are preferably axially aligned with corresponding recessed annular grooves 524 on the outer surface of the cylindrical retention portion 522 of the rear body 520, and such alignment is maintained during crimping to trap strength members 516 of the jacketed cable 510. Maintaining such alignment during crimping may advantageously improve the robustness against separation or axial slippage between the cable 510 and the end connector 500. FIGS. 5A and 5B show the cylindrical retention portion 522 and the cylindrical crimp 530 prior to crimping, so that the design of the retention features can be depicted in the figures without the distortion that may be caused by plastic deformation resulting from radial compression during the crimping process.

Figure 6A:
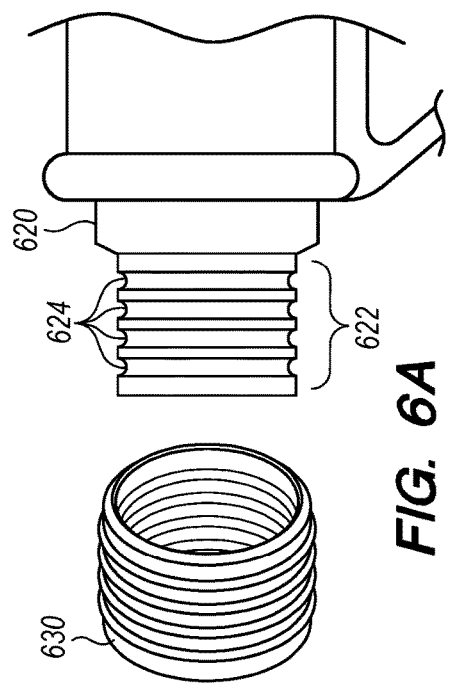
FIG. 6A depicts a rear body and crimp according to another embodiment of the present invention.
Figure 6B:
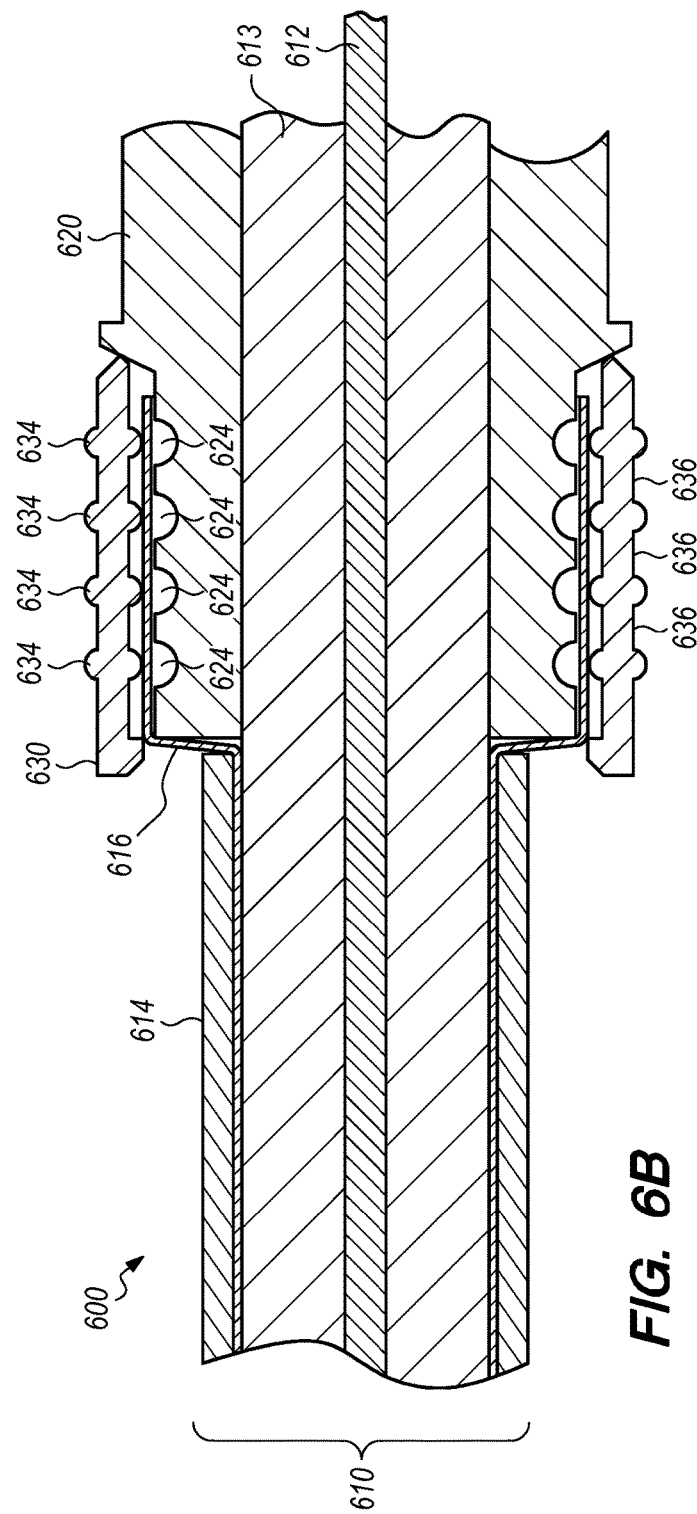
FIG. 6B depicts a cross-sectional side view of a cable end connector according to an embodiment of the present invention, which utilizes the rear body and crimp of FIG. 6A.

FIG. 6A depicts a rear body 620 and crimp 630 according to an embodiment of the present invention. FIG. 6B depicts a cross-sectional side view of a cable end connector 600 according to an embodiment of the present invention, which utilizes the rear body 620 and crimp 630. The cable end connector 600 may terminate a cable 610 having an inner core 612, 613, an outer jacket 614 that includes strength members 616 (e.g. aramid fibers). Optionally, the inner core 612, 613 includes a signal-conducting wire or fiber 612 that may be surrounded (in cross-section) by a cladding 613 that may be insulative or have a different refractive index. In some embodiments, the signal-conducting wire or fiber 612 may optionally be a conventional bundle of a plurality of optical fibers that together may carry a plurality of signals.

As shown in FIGS. 6A and 6B, the end connector 600 includes a rear body 620 that includes a cylindrical retention portion 622, an outer surface of the cylindrical retention portion 622 including a plurality of recessed annular grooves 624. FIG. 6B shows that the strength members 616 of the cable 610 may extend over and around the cylindrical retention portion 622. In certain embodiments, the cylindrical retention portion 622 may optionally include an extension of reduced diameter (not shown) that may protrude under the outer jacket 614 to help seal the rear body 620 with the cable 610. Alternatively or in addition, the end connector 600 may include a conventional bend-limiting boot that extends as an outermost component over the rear body 620 and an adjacent portion of the cable 610, to reduce relative angular deflection between them.

In the embodiment of FIGS. 6A and 6B, the end connector 600 includes a cylindrical crimp 630 that is positioned around the rear body 620. The cylindrical crimp allows the strength members 616 to extend between the cylindrical crimp 630 and the outer surface of the cylindrical retention portion 622 of the rear body 620. The crimp 630 is preferably fabricated from a malleable metal that may be plastically deformed by a conventional crimping tool. The rear body 620 may be metal or a non-metal material such as a conventional stiff plastic or composite.

As shown in FIGS. 6A and 6B, the cylindrical crimp 630 includes a plurality of thicker annular regions 634 separated by respective ones of a plurality of thinner annular regions 636. In the embodiment of FIGS. 6A and 6B, each of the plurality of thicker annular regions 634 protrudes radially outwardly relative to an adjacent one of the plurality of thinner annular regions 636 of the cylindrical crimp 630. In the embodiment of FIGS. 6A and 6B, each of the plurality of thicker annular regions 634 also optionally protrudes radially inwardly relative to an adjacent one of the plurality of thinner annular regions 636 of the cylindrical crimp 630. The thicker annular regions 634 preferably have a greater radial thickness than the thinner annular regions 636. For example, in certain embodiments a ratio of the greater radial thickness of the thicker annular regions 634, to the lesser radial thickness of the thinner annual regions 636, is preferably in the range 1.25 to 3.

During assembly, the thicker annular regions 634 of the cylindrical crimp 630 are preferably axially aligned with corresponding recessed annular grooves 624 on the outer surface of the cylindrical retention portion 622 of the rear body 620, and such alignment is maintained during crimping to trap strength members 616 of the jacketed cable 610. Maintaining such alignment during crimping may advantageously improve the robustness against separation or axial slippage between the cable 610 and the end connector 600. FIGS. 6A and 6B show the cylindrical retention portion 622 and the cylindrical crimp 630 prior to crimping, so that the design of the retention features can be depicted in the figures without the distortion that may be caused by plastic deformation resulting from radial compression during the crimping process.

In the foregoing specification, the invention is described with reference to specific example embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. An end connector for a fiber-optic cable, the fiber-optic cable having an inner core configured to conduct light and an outer jacket that includes strength members, the end connector comprising:
   a rear body, the rear body including a cylindrical retention portion, an outer surface of the cylindrical retention portion including a plurality of recessed annular grooves; and
   a malleable cylindrical crimp around the rear body, the malleable cylindrical crimp allowing the strength members to extend between the malleable cylindrical crimp and the outer surface of the cylindrical retention portion of the rear body;
   the malleable cylindrical crimp comprising a plurality of thicker annular regions separated by respective ones of a plurality of thinner annular regions, the thicker annular regions having a greater radial thickness than the thinner annular regions, the plurality of thicker annular regions being axially aligned with respective ones of the plurality of recessed annular grooves.

2. The end connector of claim 1 wherein each of the plurality of thicker annular regions protrudes radially outwardly relative to an adjacent one of the plurality of thinner annular regions of the malleable cylindrical crimp.

3. The end connector of claim 2 wherein each of the plurality of thicker annular regions also protrudes radially inwardly relative to an adjacent one of the plurality of thinner annular regions of the malleable cylindrical crimp.

4. The end connector of claim 1 wherein the malleable cylindrical crimp comprises a malleable metal from the group consisting of aluminum alloy, copper alloy, brass, or steel.

5. The end connector of claim 1 wherein a ratio of the greater radial thickness to a lesser radial thickness of the thinner annual regions is in the range 1.25 to 3.

6. An end connector for a cable, the cable having an inner core configured to conduct a signal and an outer jacket that includes strength members, the end connector comprising:
   a rear body, the rear body including a cylindrical retention portion, an outer surface of the cylindrical retention portion including a plurality of recessed annular grooves; and
   a malleable cylindrical crimp around the rear body, the malleable cylindrical crimp allowing the strength members to extend between the malleable cylindrical crimp and the outer surface of the cylindrical retention portion of the rear body;
   the malleable cylindrical crimp comprising a plurality of thicker annular regions separated by respective ones of a plurality of thinner annular regions, the thicker annular regions having a greater radial thickness than the thinner annular regions, the plurality of thicker annular regions being axially aligned with respective ones of the plurality of recessed annular grooves.

7. The end connector of claim 6 wherein each of the plurality of thicker annular regions protrudes radially outwardly relative to an adjacent one of the plurality of thinner annular regions of the malleable cylindrical crimp.

8. The end connector of claim 7 wherein each of the plurality of thicker annular regions also protrudes radially inwardly relative to an adjacent one of the plurality of thinner annular regions of the malleable cylindrical crimp.

9. The end connector of claim 6 wherein the malleable cylindrical crimp comprises a malleable metal from the group consisting of aluminum alloy, copper alloy, brass, or steel.

10. The end connector of claim 6 wherein a ratio of the greater radial thickness to a lesser radial thickness of the thinner annual regions is in the range 1.25 to 3.

11. A malleable crimp for surrounding a portion of a rear body of an end connector of a cable, the cable having an inner core configured to conduct a signal and an outer jacket that includes strength members, the malleable crimp comprising:
    a plurality of thicker annular regions;
    a plurality of thinner annular regions disposed between and adjacent to respective ones of the plurality of thicker annular regions, the thicker annular regions having a greater radial thickness than the thinner annular regions,
    wherein each of the plurality of thicker annular regions protrudes radially outwardly relative to an adjacent one of the plurality of thinner annular regions of the malleable crimp.

12. The malleable crimp of claim 11 wherein a ratio of the greater radial thickness to a lesser radial thickness of the thinner annual regions is in the range 1.25 to 3.

13. The malleable crimp of claim 11, wherein the malleable crimp is cylindrical with a substantially hexagonal cross-sectional shape.

14. The cylindrical crimp of claim 11, wherein the malleable crimp comprises a malleable metal from the group consisting of aluminum alloy, copper alloy, brass, or steel.

* * * * *